Nov. 1, 1932. W. H. CASSELL ET AL 1,885,589
PROTECTIVE COLLAR FOR BOXES
Filed March 30, 1932 2 Sheets-Sheet 1
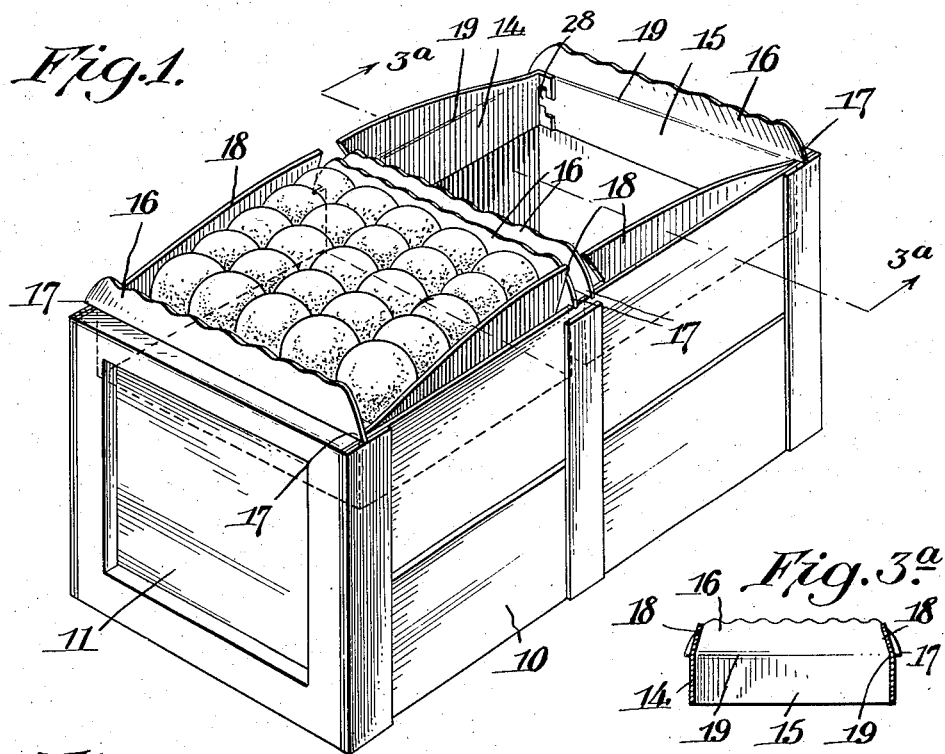
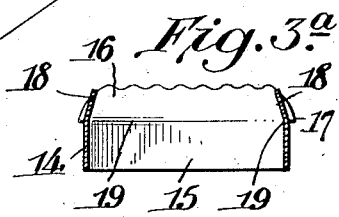
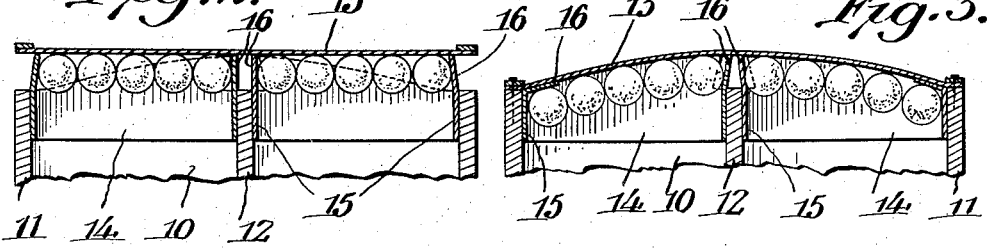
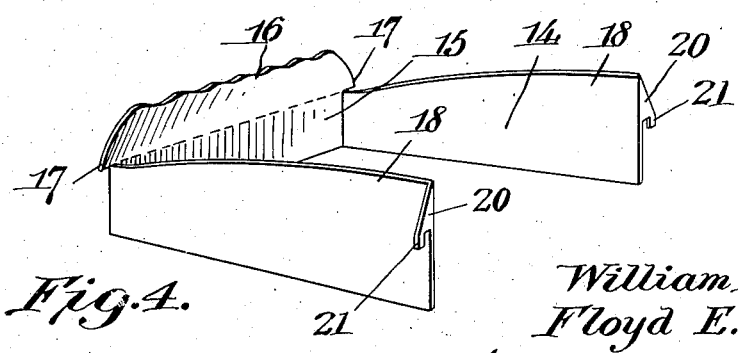
Inventors
William H. Cassell
Floyd E. Dahn Nov. 1, 1932. W. H. CASSELL ET AL 1,885,589
PROTECTIVE COLLAR FOR BOXES
Filed March 30, 1932  2 Sheets-Sheet 2
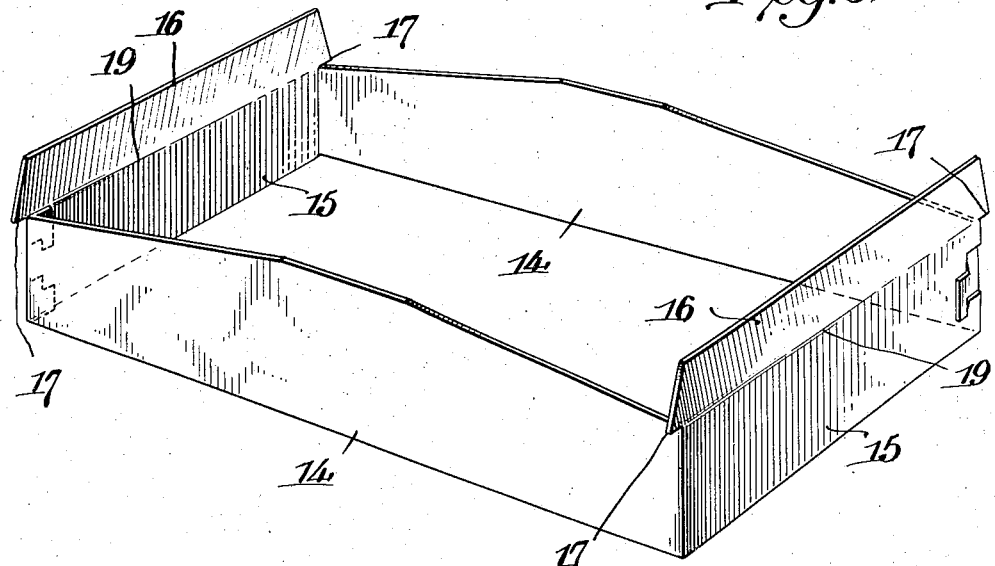
Fig. 5.
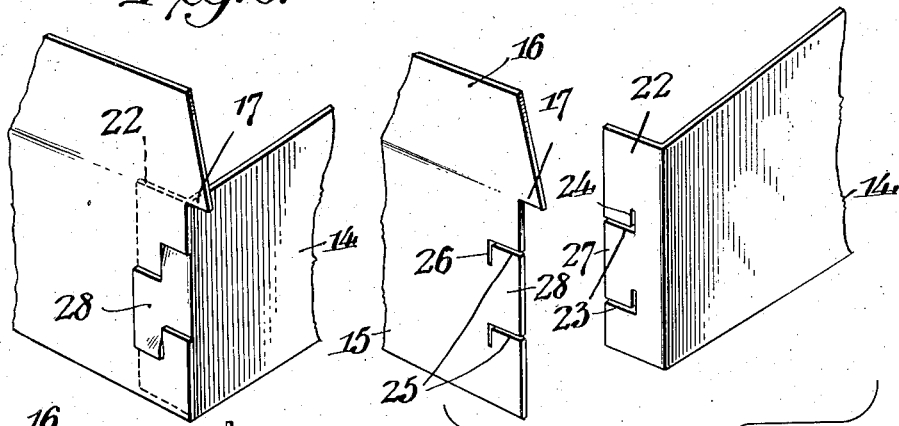
Fig. 6.
Fig. 7.
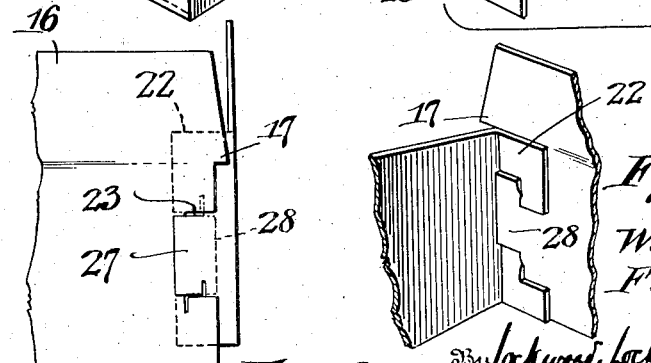
Fig. 8.
Fig. 9.
Inventors.
William H. Cassell
Floyd E. Dahn Patented Nov. 1, 1932

1,885,589

UNITED STATES PATENT OFFICE

WILLIAM H. CASSELL AND FLOYD E. DAHN, OF WENATCHEE, WASHINGTON; SAID DAHN ASSIGNOR TO SAID CASSELL

PROTECTIVE COLLAR FOR BOXES

Application filed March 30, 1932. Serial No. 602,058.

This invention relates to the packing of fruits or other perishable articles, and concerns more particularly the guard collar or lining associated with the receptacles for such articles.

The primary object of the invention is to provide a guard which is of simple and inexpensive construction, which may be quickly and easily applied to the receptacle, which is self-sustaining in character, which is equipped with improved means for maintaining the same properly positioned within the receptacle, and which is of such construction as to render it practically impossible for the collar to move down into the box during the packing operation.

A further object of the invention is to provide a guard possessing the foregoing characteristics, and which will properly protect the fruit against bruising or abrasion, either during the packing process or during the lid applying operation.

With the foregoing objects in view, together with others which will appear as the description proceeds, the invention consists in the novel construction, combination and arrangement of parts, all as will be described more fully hereinafter, illustrated in the drawings, and particularly pointed out in the claims.

In the drawings:—

Fig. 1 is a perspective view of a conventional form of fruit crate or box and showing the application thereto of collars embodying the invention, Fig. 2 is a fragmentary longitudinal sectional view taken through the crate and illustrating the relative positions of the collar, top fruit layer and lid prior to securing the lid in place, Fig. 3 is a similar view showing the assemblage in the position it will assume when the lid has been secured, Fig. 3a is a transverse sectional view taken through the collar substantially upon the line 3a—3a of Fig. 1, Fig. 4 is a perspective view of a collar involving a slight modification, Fig. 5 is a similar view showing a further modification, Fig. 6 is a fragmentary perspective view on an enlarged scale showing means whereby the ends of the collar may be secured together, Fig. 7 is a perspective view of the collar ends slightly separated, Fig. 8 is a side elevation showing the position the ends will assume in the first step of the locking operation, and Fig. 9 is a fragmentary perspective view of the interior of the collar corner and disclosing the manner in which the ends interlock.

Referring now more particularly to the drawings, the conventional form of fruit box or crate includes sides 10, ends 11, a central partition or division 12, and a lid 13. The sides in the present instance are shown as involving relatively wide boards, but it will be understood that the invention may with equal facility be used in connection with crates whose sides are constructed of slats. Moreover, the inventive characteristics may be exemplified in forms other than those disclosed herein and in association with boxes, crates, or baskets taking shapes and forms varying from the present disclosure. While the invention is described in association with fruit containers, it will be understood that it may be carried out with equal success in the packing of other articles or vegetables of more or less tender and perishable nature.

The collar or guard is formed of comparatively stiff flexible material, such as cardboard or other composition board, and constitutes a strip of ample width fitted within the upper open end of the crate or a cell thereof to guard the more or less tender fruit both in the packing as well as the lid securing operations. To this end, the collar includes sides 14 and one or more ends 15. In that form of the invention disclosed in Figs. 1, 2, 3 and 5, the collar extends entirely around the perimeter of the box or cell, and its construction will preferably involve a pair of sections of proper dimension and secured together in such manner as to easily and yet snugly engage within the open compartment or box. The skirt portions extend down within the box a distance such as will sufficiently guard the fruit against coming in direct contact with the material of which the box or crate is formed. If desired the skirts may extend an appreciable distance down into the box to protect any desired number of layers of fruit. The ends of the collar are provided with flap portions 16 which are so cut at their ends as to provide shoulders or stops 17 extending outwardly beyond the lateral edges of the collar, while the sides have upstanding flaps 18, having their upper edges preferably curved so as to substantially assume the shape of the bulged lid when the latter is secured in position. The flaps 16—18 may be scored as at 19 at their juncture with the body portions 15—14 respectively of the collar.

In practice, the collar is set up in proper shape, with the ends of the sections thereof properly secured together, whereupon the collar is set in position within the box opening. The shoulders 17 at each corner of the collar engage the box sides to limit the downward movement of the collar and firmly hold the same in position. The flaps 16—18 remain upstanding as shown in Fig. 1. The fruit is then inserted in the usual manner, and is protected against being scarred by coming in contact with the more or less sharp edges of the box because of the collar and the flaps thereof. When the box has been filled the top layer of fruit will assume the position substantially as shown in Fig. 2, whereupon the lid 13 is placed upon the said top layer. Upon pressing down the ends of the lid into contact with the box ends, the fruit will move down under this pressure and thus become a compact mass, the upper layer of which will assume the position as shown in Fig. 3. In this operation the top layer will more or less be compressed and the end pieces thereof will be brought into intimate contact with such portions of the box as would most likely result in abrasion or scarring thereof were it not for the collar as specifically constructed and applied. The end flaps 16 may, if desired, be of such length as to practically overlie the upper layer of fruit and thus protect the upper surface thereof against abrasion by the box lid, or the flaps may be relatively short so as to overlie the end pieces as shown in Fig. 3, which pieces usually need the greatest protection. The flaps 16 at the center partition 12 properly guard the adjacent pieces against coming in contact with the sharp edges thereof, and when the box is properly packed will assume the position substantially as shown in Fig. 3. The side flaps 18 project above the upper edge of the box sides a distance sufficient to protect the next adjacent fruit layer against intimate contact with the box edge, thus adequately protecting such layer. By scoring the collar body at 19, the upstanding flaps 16—18 readily assume the positions shown in the drawings, and it may be noted that the flaps 18 will incline to the position substantially as shown in Fig. 3a when the box is properly packed.

The collar shown in Fig. 4 is designed particularly for a double compartment box or crate and dispenses with the end next adjacent to the central partition 12. Such a collar may be easily and inexpensively constructed of a single piece of cardboard. The extremities of the sides 14 are cut and bent laterally outwards so as to provide lateral projections 20 with relatively short depending wings or tongues 21. These tongues are spaced from the collar side a distance substantially equal to the thickness of the adjacent box wall, to engage over the upper edge of such wall and securely interlock therewith. The recess thus formed in the lateral projections for this locking action will be substantially horizontally aligned with the shoulders 17 at the opposite end of the collar.

In that form of the invention disclosed by Fig. 5 of the drawings, the collar is particularly designed for apple packing, wherein a box with a single cell is used. The construction of this type of collar is substantially the same as that heretofore described, with slight variations necessitated by the specific construction of the box with which it will be used. Its operation is identical with that of the crate structure heretofore described.

In instances where the improved collar is constructed of separate pieces and secured together, such pieces may be pasted or taped at their adjoining ends or may be secured in any other preferred manner. In Figs. 6 to 9 inclusive we have illustrated our preferred method for securing adjoining ends of collar sections, wherein the ends of the side sections 14 are bent at right angles to provide skirts 22 with spaced incisions 23 parallel to each other and to the upper and lower edges of the skirt. These incisions extend inwardly of the skirt a substantial distance, whereupon they extend a short distance perpendicularly in parallel alignment as indicated at 24. The adjacent end of the portion 15 is similarly cut, the spaced parallel incisions being indicated at 25, while the end incisions are indicated at 26. These latter incisions extend downwardly or in a direction opposite to that of the incisions 24 of the companion collar portion. The incisions 23—25 are spaced apart a distance substantially equal, while the depth of incisions 24—26 is identical.

This construction provides tabs 27—28 on the side and end members respectively of the collar, which tabs interlock with each other as shown in Figs. 6, 8 and 9 to securely hold the collar sections together.

From the foregoing it is apparent that we have provided a protective collar which is of extremely simple construction and yet which will prove fully capable of accomplishing the desired ends. By the use of such collar it is apparent that improper application of the same to the box or crate is prevented; the construction of the collar enabling the same only to be correctly applied. As the collar is held at its four corners, it will be practically impossible by crowding to push the collar with the fruit down into the box as frequently occurs with other forms of protective collar.

Having thus described our invention, we claim:—

1. A guard collar for boxes, comprising a body having sides and an end, said body adapted to fit within the open end of the box and to snugly engage the sides and end thereof, and shoulders projecting longitudinally from said end beyond the sides of said body.

2. A guard collar for boxes, comprising a body having sides and an end, said body adapted to fit within the open end of the box, and shoulders at the ends of said sides projecting longitudinally from said end.

3. A guard collar for boxes, comprising a body having sides and an end, said body adapted to fit within the open end of the box, shoulders on said body end projecting laterally beyond the sides of the body, and projections on said sides extending laterally therefrom to rest upon portions of the box sides.

4. A guard collar for boxes, comprising a body having sides and an end, said body adapted to fit within the open end of the box, means at one end of said body cooperating with adjacent portions of the box to prevent downward movement of the body, and lateral projections on said body to rest upon and interlock with portions of the box sides.

5. A guard collar for boxes, comprising a body having sides and an end shaped to fit within the open end of the box, lateral projections on said body to rest upon portions of said box sides, and tongues on said projections to engage over said sides.

6. A guard collar for boxes, comprising a body shaped to fit within the open end of the box, projections on said body extending laterally beyond the same, and tongues depending from said projections a distance substantially equal to the thickness of the box sides.

7. A guard collar for boxes, comprising a body shaped to fit within the open end of the box, wings projecting laterally beyond said body and below the upper edge of the same, and tongues depending from said wings, the distance between the tongues and the body being substantially equal to the thickness of the box sides.

8. A guard collar for boxes, comprising a body having sides and an end, an upstanding flap on said end of greater length than the breadth of said body to provide shoulders and means to support the opposite ends of said sides.

9. A guard collar for boxes, comprising a body having sides and an end and adapted to fit within the box, a member projecting upwardly from said end, and shoulders on said member projecting longitudinally beyond said end.

In witness whereof, we have hereunto affixed our signatures.

WILLIAM H. CASSELL.
FLOYD E. DAHN.